(12) United States Patent
Meyer et al.

(10) Patent No.: US 12,259,316 B2
(45) Date of Patent: Mar. 25, 2025

(54) CLEANING DEVICE FOR CLEANING AN OUTER PORTION OF A SENSOR

(71) Applicant: Endress+Hauser Conducta GmbH+Co. KG, Gerlingen (DE)

(72) Inventors: Hans Meyer, Eschach (DE); Alejandro Vaca Torres, Steinheim (DE); Marvin Buchfink, Leonberg (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 37 days.

(21) Appl. No.: 18/064,996

(22) Filed: Dec. 13, 2022

(65) Prior Publication Data

US 2023/0184670 A1 Jun. 15, 2023

(30) Foreign Application Priority Data

Dec. 15, 2021 (DE) ...................... 10 2021 133 192.7

(51) Int. Cl.
*G01N 21/15* (2006.01)

(52) U.S. Cl.
CPC ....... *G01N 21/15* (2013.01); *G01N 2021/151* (2013.01); *G01N 2021/152* (2013.01)

(58) Field of Classification Search
CPC .......................... G01N 21/15; G01N 2021/151
See application file for complete search history.

(56) References Cited

U.S. PATENT DOCUMENTS

| 3,731,091 | A | * | 5/1973 | Rosso | G01N 33/1833 |
| | | | | | 250/301 |
| 11,305,733 | B2 | * | 4/2022 | Herrmann | H04N 23/811 |
| 2013/0008466 | A1 | * | 1/2013 | Karagoz | A61B 1/126 |
| | | | | | 134/6 |
| 2017/0239693 | A1 | * | 8/2017 | Nabavi | H04N 23/811 |

(Continued)

FOREIGN PATENT DOCUMENTS

| CN | 105784597 A | * | 7/2016 | ............ B65G 43/02 |
| CN | 206114527 U | * | 4/2017 | |

(Continued)

OTHER PUBLICATIONS

CN-206114527-U—English Machine Translation (Year: 2017).*
CN-111751284-A—English Machine Translation (Year: 2020).*

*Primary Examiner* — Marc Carlson
(74) *Attorney, Agent, or Firm* — Gil M. Repa; Endress+Hauser (USA) Holding, Inc.

(57) ABSTRACT

A cleaning device for cleaning an outer portion of a sensor includes: a pump connected to an air supply line; a pressure accumulator connected to the pump in a housing of the cleaning device, which can be mounted on the sensor; and an exhaust air duct with a pressure-controlled valve connected to the pressure accumulator and connected to at least one nozzle which is aligned on the outer portion to be cleaned. The cleaning device is configured to perform pressure-surge cleaning operations in which air drawn in by the pump is compressed in the pressure accumulator, and the compressed air in the pressure accumulator is expelled as a (Continued)

pressure surge via the at least one nozzle when pressure exerted by the compressed air enclosed in the pressure accumulator exceeds a pressure value required to temporarily open the pressure-controlled valve.

19 Claims, 5 Drawing Sheets

(56) References Cited

U.S. PATENT DOCUMENTS

| | | | |
|---|---|---|---|
| 2018/0098495 A1* | 4/2018 | Van Meurs | A01D 75/00 |
| 2018/0265048 A1* | 9/2018 | Schmidt | B60S 1/566 |
| 2019/0100168 A1* | 4/2019 | Krishnan | B60S 1/0818 |
| 2019/0345923 A1* | 11/2019 | McCoy | F04B 35/01 |
| 2021/0325316 A1* | 10/2021 | Frank | B08B 1/12 |

FOREIGN PATENT DOCUMENTS

| | | | | |
|---|---|---|---|---|
| CN | 111751284 A | * | 10/2020 | |
| DE | 102009045472 A1 | * | 4/2011 | G01N 21/15 |
| DE | 102011078617 A1 | * | 1/2013 | G01N 21/15 |
| EP | 0590487 A1 | * | 4/1994 | |
| KR | 102481365 B1 | * | 12/2022 | |
| WO | WO-03078975 A2 | * | 9/2003 | G01N 21/15 |
| WO | WO-2016058105 A1 | * | 4/2016 | B08B 1/005 |

* cited by examiner

CLEANING DEVICE FOR CLEANING AN OUTER PORTION OF A SENSOR

The present application is related to and claims the priority benefit of German Patent Application No. 10 2021 133 192.7, filed Dec. 15, 2021, the entire contents of which are incorporated herein by reference.

TECHNICAL FIELD

The present disclosure relates to a cleaning device for cleaning an outer portion of a sensor which is in contact with a medium during measuring mode for measuring a measured variable of the medium, a measuring device comprising the cleaning device and the sensor, and a cleaning method which can be carried out by means of the cleaning device.

BACKGROUND

Sensors for measuring a measured variable of a medium are used in applications of the most varied types for measuring a multiplicity of different measured variables.

To be able to measure measured variables such as, for example, chemical, physical or biological measured variables of a medium, these sensors usually have an outer portion in contact with the medium during measuring mode, via which or through which the measurement takes place. For example, sensors such as optical sensors, photometers and spectrometers have outer portions comprising windows, which are generally transparent to electromagnetic radiation and through which electromagnetic radiation used for measuring the measured variable passes. Examples thereof are calorimetric sensors, turbidity sensors, sensors for measuring a spectral absorption coefficient of the medium, as well as sensors for measuring a concentration of an analyte contained in the medium, such as sensors for measuring a nitrite content, a nitrate content, or an ammonium content. A further example is sensors such as conductivity sensors with outer portions which are in contact with the medium during the measurement and are electrode surfaces.

In a large number of applications, the problem exists that outer portions of the sensors exposed to the medium become soiled over time. Contamination of the outer portions generally leads to impairments of the measurement properties, especially the measurement accuracy, of these sensors. Depending on the medium and application, contamination of different types and composition can occur. Thus, the outer portions of sensors used in a clarification system can be soiled over time, for example, by solids such as sand or hair, by fats, by biofilms forming thereon, and/or by algae growing thereon.

To solve this problem, various types of cleaning devices for cleaning outer portions of sensors are known from the prior art.

One example is cleaning devices equipped with a wiper for carrying out wiper cleanings. Thus, for example, DE 10 2011 078 617 A1 describes a measuring device with a sensor, the end-side outer portion of which is cleaned by means of a wiper designed as a partial component of a peripheral attachment.

However, wipers equipped with a wiper lip or brushes can cause the outer portions to be cleaned to scratch in conjunction with abrasive contaminants such as sand. The latter can lead to a deterioration of the achievable measurement accuracy, especially in the case of optical sensors. In the case of fibrous contaminants, there is, moreover, the risk of fibers winding around the wiper and/or the mechanical components swinging the wiper. Under certain circumstances, this can lead to impairments of the wiper mobility.

A further example is cleaning devices operating with compressed air. For example, DE 10 2009 045 472 A1 describes a measuring system which comprises a sensor that can be mounted with a fitting tube at a place of use, and whose outer region in contact with the medium is cleaned with compressed air. In this case, the compressed air is supplied to the outer portion via a supply line extending through the fitting tube.

Cleaning devices operating with compressed air are especially suitable for applications in which fiber-like contaminants can occur, and they are much more suitable than cleaning systems working with wipers. Cleaning devices operated with compressed air require, however, that the compressed air can be made available at the location of use of the sensor. Furthermore, it must be ensured that the compressive force exerted by the compressed air on the contaminants is great enough to remove contamination adhering to the outer portion of the sensor to be cleaned. Accordingly, a compressed air generator, e.g., a compressor, is required to generate the compressed air, which must be all the more powerful, and accordingly all the larger, the longer the supply lines are through which the compressed air is supplied to the outer portion of the sensor to be cleaned. Long supply lines are required, for example, in conjunction with sensors designed as immersion probes, which are mounted at the place of use by means of a sensor suspension anchored above the medium. In this case, sensor suspensions for the immersion of a sensor into a clarification basin can have, for example, a length of several meters. Accordingly, the supply line extending from the compressed air generator to the sensor must also have a correspondingly long length in these applications. Depending on the place of use, additional measures can be required to protect the pressure generator from frost so that a reliable functioning of the cleaning device is ensured even in the event of a cold snap at the place of use.

SUMMARY

It is an object of the present disclosure to specify a cleaning device for cleaning an outer portion of a sensor which is in contact with a medium during measuring mode, which can be used in a versatile manner, and with which a pronounced cleaning effect can be achieved.

To this end, the present disclosure comprises a cleaning device for cleaning an outer portion of a sensor in contact with a medium during measuring mode for measuring a measured variable of the medium, the cleaning device comprising:
- a pump connected on the input side to a supply line designed as an air supply line;
- a pressure accumulator connected on the output side to the pump and arranged in a housing of the cleaning device that can be mounted or is mounted on the sensor; and
- an exhaust air duct, which is equipped with a pressure-controlled valve or a pressure-controlled valve designed as a check valve, is connected to the pressure accumulator, and is connected or can be connected to at least one nozzle, which is oriented or can be oriented toward the outer portion to be cleaned,
- wherein the cleaning device is designed to carry out cleaning processes, which each include at least one pressure-surge cleaning in which air sucked in by means of the pump is compressed in the pressure accumulator via the supply line, and at least a portion of the compressed air generated in the pressure accumulator is expelled in the form of a pressure surge via the nozzle(s) connected to the exhaust air duct when pressure exerted by the compressed air enclosed in the pressure accumulator exceeds a pressure value required for opening the pressure-controlled valve.

The cleaning device offers the advantage that, by means of the compressed air which is output in a shock-like manner via the pressure-controlled valve during each pressure-surge cleaning and correspondingly strikes the outer portion to be cleaned in a shock-like manner via the nozzle(s), a very strong cleaning effect is achieved. Furthermore, it offers the advantage that the pressure in the pressure accumulator, which triggers the pressure-surge cleaning, is built up in the immediate vicinity of the outer area to be cleaned. Losses caused by line resistances are thus significantly lower than with cleaning devices in which the compressed air is generated at a greater distance from the sensor.

First embodiments provide that the pump and the pressure accumulator are arranged in the housing of the cleaning device, and/or the cleaning device is designed either as a component of a measuring device comprising the sensor and the cleaning device, or is designed as a device which can be mounted on the sensor and comprises at least one of the nozzles, and/or its exhaust air duct can be connected to any nozzle designed as a component of the sensor.

Further embodiments provide that the cleaning device:
 has at least one extension formed onto the housing, in which the nozzle or at least one of the nozzles is arranged; or
 two extensions integrally formed on opposite sides of the housing of the cleaning device, or two extensions which are integrally formed on opposite sides of the housing of the cleaning device when the cleaning device is connected to the sensor, surround at least a portion of the sensor, wherein at least one of the nozzles is arranged in at least one of the two extensions.

According to an embodiment, the cleaning device additionally comprises a wiper drive, an electric wiper drive or a pneumatic wiper drive, and a wiper operable by means of the wiper drive for carrying out wiper cleanings of the outer portion.

According to a further embodiment, the cleaning device is designed such that each cleaning process comprises at least one pressure-surge cleaning and ends with a wiper cleaning carried out by means of the wiper.

Another embodiment provides that:
 the wiper drive comprises a piston arranged in a piston housing, wherein a first chamber and a second chamber separated from the first chamber by the piston are located in the piston housing;
 the piston is connected to a shaft of the wiper by means of a mechanical converter in such a way that a movement of the piston from a first end position, in which the piston abuts against a first stop which delimits the first chamber on a side facing away from the second chamber, into a second end position, in which the piston abuts against a second stop opposite the first stop, causes a rotary movement of the wiper arm corresponding thereto from a starting position into an end position; and
 the pump is connected via the discharge line connected to the pump on the output side to an inlet of the piston housing which opens into the first chamber.

An embodiment of such an embodiment comprises a cleaning device in which the first chamber forms the pressure accumulator, and which is designed such that the pressure-controlled valve is opened by a pressure prevailing in the first chamber when the piston moved by the pressure prevailing in the first chamber reaches the second end position.

Yet another embodiment comprises a cleaning device, in which:
 the exhaust air duct in the piston housing opens out in a recess open towards the interior of the piston housing, or a recess formed by a section of a bore extending through the piston housing or a branch channel running around the inside in the piston housing; and
 the recess is arranged at a height within the piston housing which is dimensioned such that a lower edge of the recess facing the second stop adjoins a top side of an outer edge of the piston facing the first chamber when the piston is in the second end position.

Yet another embodiment comprises a cleaning device which comprises:
 a spring designed as a compression spring arranged in the second chamber, a spring designed as a tension spring arranged in the first chamber, or a spring arranged outside the piston housing and/or connected to a spindle of the converter or the wiper,
 wherein the spring comprises at least one spring element, at least one spring element designed as a compression spring element, a tension spring element, a coil spring element or a diaphragm, or a plurality of coupled spring elements, and
 wherein the spring is designed such that the spring is tensioned by the movement of the piston from the first end position to the second end position, and the piston is moved back into the first end position by the spring force of the tensioned spring when the pressure in the first chamber drops due to the pressure surge output via the pressure-controlled valve.

A further embodiment comprises a cleaning device, which comprises:
 a supply air controller designed to temporarily close and subsequently reopen the inlet opening into the first chamber during each pressure-surge cleaning performed with the cleaning device; or
 a supply air controller with a gate valve and a return spring, wherein:
 the gate valve is arranged displaceably in a recess in a housing wall region of the piston housing through which the inlet extends;
 the recess has a closed end region and an open-end region which is opposite the closed end region and is connected to the interior of the piston housing via an opening, or an opening formed by a section of a branch channel which runs around the inner side in the piston housing;
 the opening is arranged at a height within the piston housing which is dimensioned such that a lower edge of the opening facing the second stop is adjacent to an upper side of an outer edge of the piston facing the first chamber, when the piston is in the second end position;
 the gate valve is designed such that it is pushed, through the pressure prevailing in the first chamber, into a locking position closing the inlet when the piston reaches the second end position;
 the return spring is designed and arranged in the recess such that the return spring is tensioned by the displacement of the gate valve into the locking position and pushes the gate valve into a passage position when the compressive force exerted through the opening on the gate valve falls below the restoring force of the tensioned return spring; and the gate valve has a passage channel extending through the gate valve, which passage channel is oriented and arranged such that it forms a channel which is arranged in the inlet and connects the first chamber to the discharge line connected on the output side to the pump when the gate valve is in the passage position.

Another embodiment comprises a cleaning device, in which:

the second chamber is designed as a closed chamber; or the second chamber is designed as a ventilated and vented chamber to which is connected an exhaust air duct that is equipped with an outlet valve or an outlet valve designed as a check valve, and via which the second chamber is vented when the pressure in the second chamber exceeds a predetermined pressure upper limit, and which is connected to the supply line via a supply air duct that is equipped with an inlet valve or an inlet valve designed as a check valve, and via which the second chamber is ventilated when the pressure in the second chamber falls below a predetermined pressure lower limit.

Yet another embodiment comprises a cleaning device, in which:

the converter comprises a spindle which extends through the piston and is offset by an axial movement of the piston into a rotational movement about its longitudinal axis corresponding to the axial movement, and which is connected at the end to the shaft of the wiper in such a way that a rotational movement of the spindle causes a wiper movement of the wiper arm corresponding thereto, and/or the wiper drive comprises at least one anti-rotation lock or at least one anti-rotation lock designed as a securing pin extending through an outer edge region of the piston, which prevents rotation of the piston about its longitudinal axis.

Yet another further embodiment comprises a cleaning device which comprises one or more nozzles arranged along the wiper arm and connected to the exhaust air duct, wherein the exhaust air duct:

is connected to the nozzles either via a connection and/or via a connecting line that extends outside the housing of the cleaning device and has a line extending through the wiper arm within the wiper; or can be connected to a line that is connected to the nozzles via a plurality of line portions connected to one another during each pressure-surge cleaning, and extends through the wiper arm within the wiper, wherein the line portions comprise:

a first line portion which is connected to the line running through the wiper arm and extends along the shaft of the wiper or through the shaft, and extends in a direction running parallel to the shaft into a rotary disk connected to the spindle, wherein the rotary disk is arranged in the piston housing on a side of the second stop facing away from the first chamber;

a second line portion which is connected to the first line portion and runs radially outwards within the rotary disk and opens out on an outer side of the rotary disk; and a third line portion connected to the waste air duct, which runs at least in portions through a housing wall of the piston housing and opens into the interior of the piston housing at the level of the mouth of the second line portion at a position which is opposite the mouth of the second line portion when the rotating rotary disk which is connected to the spindle is located in the second end position.

Another further embodiment comprises a cleaning device which comprises one or more nozzles which are arranged along the wiper arm and are connected or can be connected to the exhaust air duct and which are arranged on the side of the wiper arm which, when the wiper arm is in the end position, points in the direction of the initial position.

Furthermore, the present disclosure comprises a method which can be performed according to the disclosed embodiments, for cleaning the outer portion of the sensor which is in contact with the medium in the measuring mode and in which at least one cleaning process is performed, wherein each cleaning process comprises at least one pressure-surge cleaning process and ends with a wiper-cleaning process.

Furthermore, the present disclosure comprises a measuring device having a cleaning device according to the present disclosure and a sensor in which the cleaning device is permanently or detachably connected to the sensor, and/or the pump is arranged in the housing of the cleaning device.

BRIEF DESCRIPTION OF THE DRAWINGS

The present disclosure and its advantages will now be explained in detail using the figures in the drawing, which show several examples of embodiments. The same elements are indicated by the same reference numbers in the figures.

DETAILED DESCRIPTION

Figure 1:
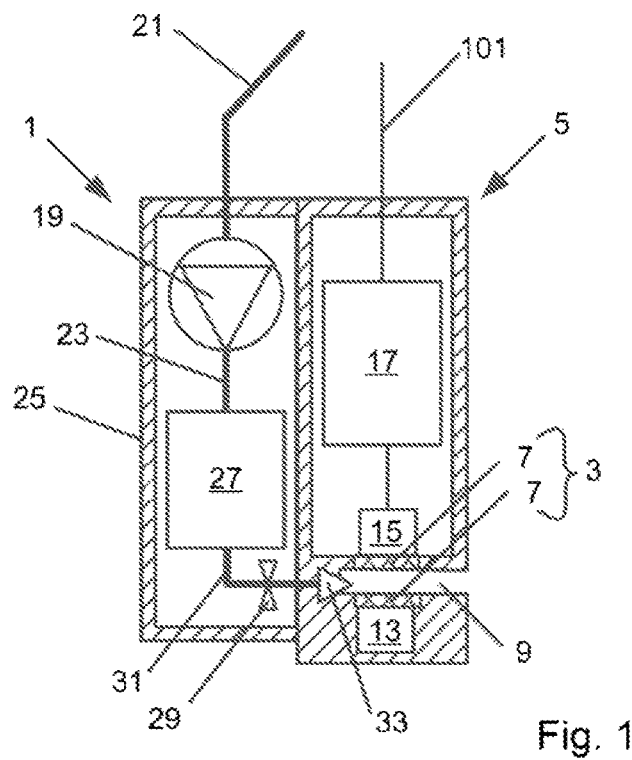
FIG. 1 shows a measuring device having a sensor and a cleaning device according to the present disclosure.

The present disclosure relates to a cleaning device 1 for cleaning an outer portion 3 of a sensor 5 which is in contact with a medium during measuring mode, for measuring a measured variable of the medium, a measuring device comprising the sensor 5 and the cleaning device 1, and a cleaning method, which can be carried out by means of the cleaning device 1.

The cleaning device 1 can be used especially in conjunction with sensors 5 which are designed to carry out measurements of the measured variable via or through the outer portion 3 in contact with the medium during measuring mode. In this respect, the sensor 5 is, for example, an optical sensor, a photometer or a spectrometer, the outer portion 3 of which comprises at least one window 7 transparent to electromagnetic radiation, through which electromagnetic radiation used for measuring the measured variable passes. Examples thereof are calorimetric sensors, turbidity sensors, sensors for measuring a spectral absorption coefficient of the medium, as well as sensors for measuring a concentration of an analyte contained in the medium, such as, for example, sensors for measuring a nitrite content, a nitrate content or an ammonium content.

FIG. 1 shows an example of a measuring device in which the sensor 5 comprises a recess 9 which is open towards the environment, such as a measuring gap for receiving the medium. The outer portion 3 of the sensor 5 to be cleaned comprises two windows 7 arranged opposite one another on both sides of the recess 9, through which windows 7 the measured variable is measured. For this purpose, the sensor 5 comprises, for example, a radiation source 13 arranged on one side of the recess 9, for example a light source, by means of which radiation is transmitted through the adjoining window 7, the medium located in the recess 9, and the opposite window 7 to a detector 15 during the measuring mode. In this case, the measured variable is determined and output, for example, by means of a measuring electronics 17 connected to the detector 15.

Figure 2:
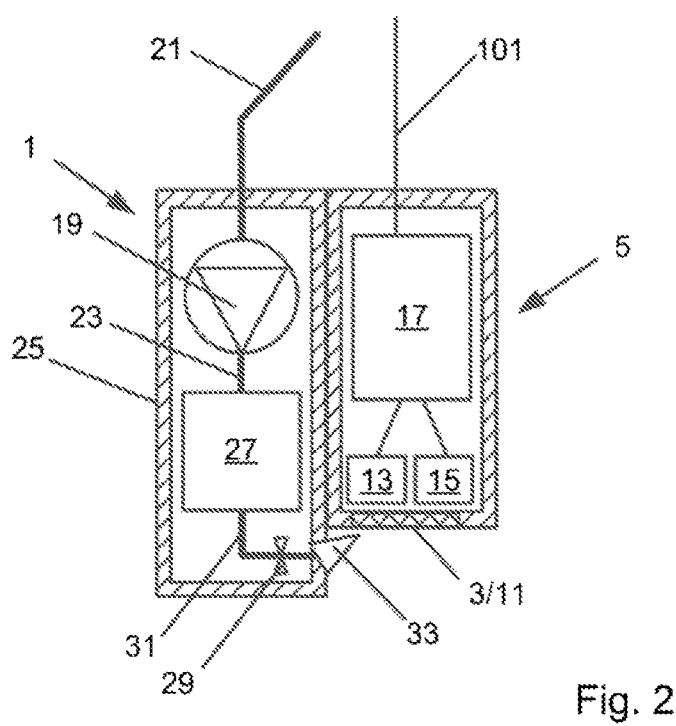
FIG. 2 shows a further measuring device having a sensor and a cleaning device according to the present disclosure.

FIG. 2 shows a further measuring device in which the outer portion 3 of the sensor 5 to be cleaned comprises a window 11 arranged on an outer side, for example, an end face, of the sensor 5. In this variant, the radiation source 13 transmits electromagnetic radiation through the window 11 into the medium in the measurement mode and the detector 15 receives electromagnetically radiation reflected or scattered by the window 11 in the direction of the detector 15 after interaction with the medium. The measured variable is also determined and output here, for example, by means of a measuring electronics unit 17 connected to the detector 15.

However, the use of the cleaning device 1 is not limited to sensors operating with electromagnetic radiation, such as optical sensors operating for example with ultraviolet or infrared light. The cleaning device 1 can also be used analogously for cleaning other sensors, such as ultrasonic sensors or conductivity sensors. In conductivity sensors, the outer portion to be cleaned comprises, for example, at least one electrode surface.

The cleaning device 1 comprises a pump 19 which is connected on the input side to a supply line 21 serving as an air supply line and is connected on the output side to a pressure accumulator 27 via a discharge line 23. The pressure accumulator 27 is arranged in a housing 25 of the cleaning device 1 which can be mounted or is mounted on the sensor 5 and is connected via an exhaust air duct 31 of the cleaning device 1, which is equipped with a pressure-controlled valve 29, to at least one nozzle 33 which is respectively aligned or can be aligned on the outer portion 3 of the sensor 5 to be cleaned. The pressure-controlled valve 29 is preferably a check valve. Alternatively, the pressure-controlled valve 29 can also comprise a control slide. A flat jet nozzle is especially suitable as the nozzle 33.

The cleaning device 1 is designed to perform a cleaning method in which at least one cleaning operation is performed in each case. Each cleaning process comprises at least one pressure-surge cleaning. In each pressure-surge cleaning, air sucked in via the feed line 21 is compressed by means of the pump 19 in the pressure accumulator 27, and at least a portion of the compressed air produced in this way in the pressure accumulator 27 is ejected in the form of a pressure surge via the nozzle(s) 33 connected to the exhaust air duct 31 when pressure exerted by the compressed air enclosed in the pressure accumulator 27 on the pressure-controlled valve 29 exceeds a pressure value required for opening the pressure-controlled valve 29. Due to the output of the pressure surge, the pressure in the pressure accumulator 27 decreases abruptly. This leads to the fact that the pressure-controlled valve 29 automatically closes again and, in the pressure accumulator 27, a pressure can again be built gradually by means of the pump 19 and a further pressure-surge cleaning can be performed.

The present disclosure has the above-mentioned advantages. Optionally, individual components of the cleaning device 1, the measuring device comprising the cleaning device 1 and/or the cleaning method that can be executed by means of the cleaning device can each have different configurations. Some currently especially preferred examples thereof are listed below.

Since the pressure in the pressure accumulator 27 can be built up gradually by means of the pump 19, a pump with low power, for example a power of 1 watt, is already sufficient to generate a high pressure in the pressure accumulator 27, such as, for example, a pressure of up to 3 bar. The correspondingly small size of the pump 19 offers the advantage that the cleaning device 1 can be designed as a compact device in which the pump 19 and the pressure accumulator 27 are arranged in the housing 25 of the cleaning device 1.

This compact embodiment shown in FIGS. 1 and 2 offers the advantage that the pump 19, the pressure accumulator 27 and the nozzle(s) 33 are arranged at a small distance from one another and are accordingly small due to power losses caused by line resistances. Another advantage is that the cleaning device 1 can also be used at operating locations where neither an external compressed air generator is available nor a sufficiently protected location is present outside the medium for accommodating the pump 19. Furthermore, the pump 19 arranged in the housing 25 of the cleaning device 1 in the measuring device is surrounded by the medium when the sensor 5 is immersed in the medium. As a result, it is protected against ambient conditions possibly occurring at the site of use, and possibly also against frost.

Alternatively, however, the pump 19 can also be arranged outside the housing 25 of the cleaning device 1. In this case, no electrical components are preferably arranged in the housing 25 of the cleaning device 1. The latter is especially advantageous when the sensor 5 and thus also the housing 25 of the cleaning device 1 are to be used in regions subject to explosion hazard where electrical components must meet particular safety requirements in order to ensure that they cannot trigger an explosion even in the event of a technical defect.

As shown in FIG. 1, the cleaning device 1 is designed, for example, as a component of the measuring device that is permanently connected to the sensor 5. Alternatively, the cleaning device 1 is designed, for example, as a device which is detachably connected or which can be detachably connected to the sensor 5. This variant shown in FIG. 2 offers the advantage that already existing sensors 5 can also be retrofitted as required. In both variants, the nozzle 33 or each of the nozzles 33 is in each case formed either as a component of the cleaning device 5 connected to the exhaust air duct 31 or as a component of the sensor 5 which is connected or can be connected to the exhaust air duct 31.

Figure 3:
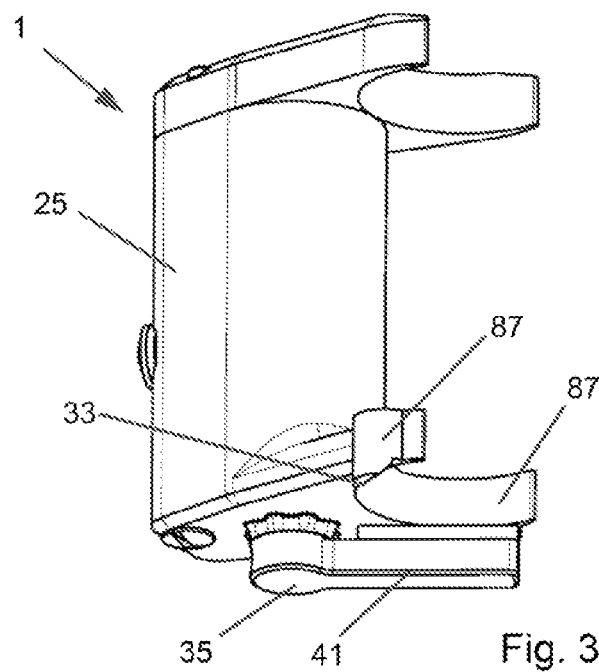
FIG. 3 shows a view of a cleaning device having a wiper according to the present disclosure.

Optionally, the cleaning device 1 additionally has a wiper 35 which can be operated by means of a wiper drive for carrying out wiper cleaning of the outer portion 3. FIG. 3 shows a view of such a cleaning device 1 which can be mounted on a sensor 5 such as, for example, the sensor 5 shown in FIG. 2, in such a way that the wiper 35 rests against an outer or end face of the sensor 5 comprising the outer portion 3 of the sensor 5 to be cleaned.

Figure 4:
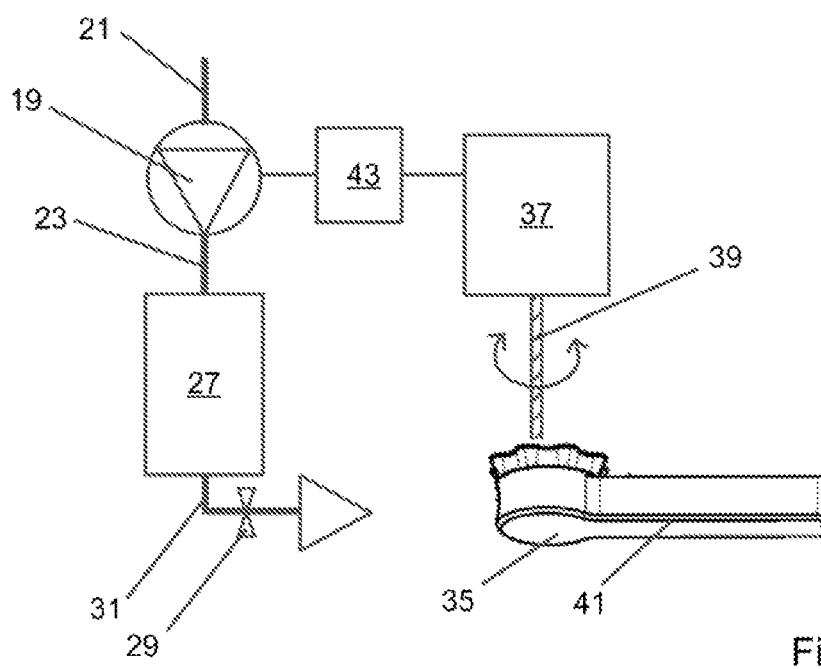
FIG. 4 shows a schematic of a cleaning device having an electrically driven wiper.

In principle, the wiper 35 can be operated independently of the components of the cleaning device 1 that serve to carry out the pressure-surge cleaning. In this case, the wiper drive is designed, for example, as an electric drive. FIG. 4 shows an example of a schematic representation of a cleaning device 1, the wiper drive of which comprises an electric motor 37 which is connected to a shaft 39 of the wiper 35 in such a way that a rotation of the shaft 39 caused by the electric motor 37 causes a wiper movement of a wiper arm 41 of the wiper 35 corresponding thereto, in which the wiper arm 41 rotates about an axis of rotation formed by the shaft 39.

In this variant, the cleaning device 1 preferably comprises a controller 43 which is connected to the pump 19 and the electric motor 37 and is designed to control the pump 19 and the electric motor 37 in such a way that each cleaning process which can be carried out by means of the cleaning device 1 includes at least one pressure-surge cleaning operation and finishes with a wiper cleaning carried out by means of the wiper 35. This offers the advantage that, after the execution of the pressure-surge cleaning(s), any air bubbles remaining on the surface of the outer portion 3 are removed by the wiper 35 during the subsequent wiper cleaning. The removal of the air bubbles is advantageous especially in conjunction with sensors 5, such as optical sensors, in which air bubbles located on the outer portion 3 can possibly lead to impairments of the measurement properties, especially the measurement accuracy. In addition, this cleaning method offers the advantage that, as a result of previous pressure-surge cleaning, already-removed, possibly abrasive, contamination components in the subsequent wiping cleaning, can no longer lead to scratching of the outer portion 3.

Figure 5:
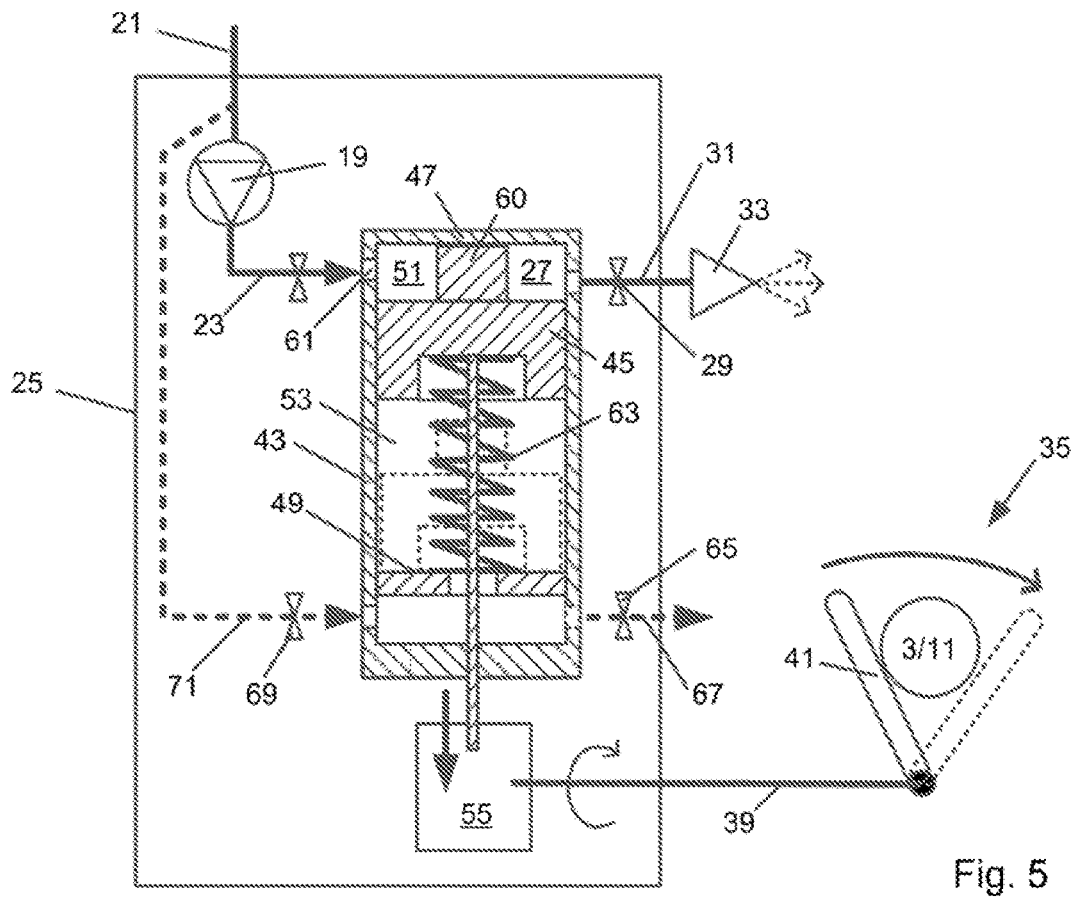
FIG. 5 shows a schematic of a cleaning device having a pneumatically driven wiper.
Figure 6:
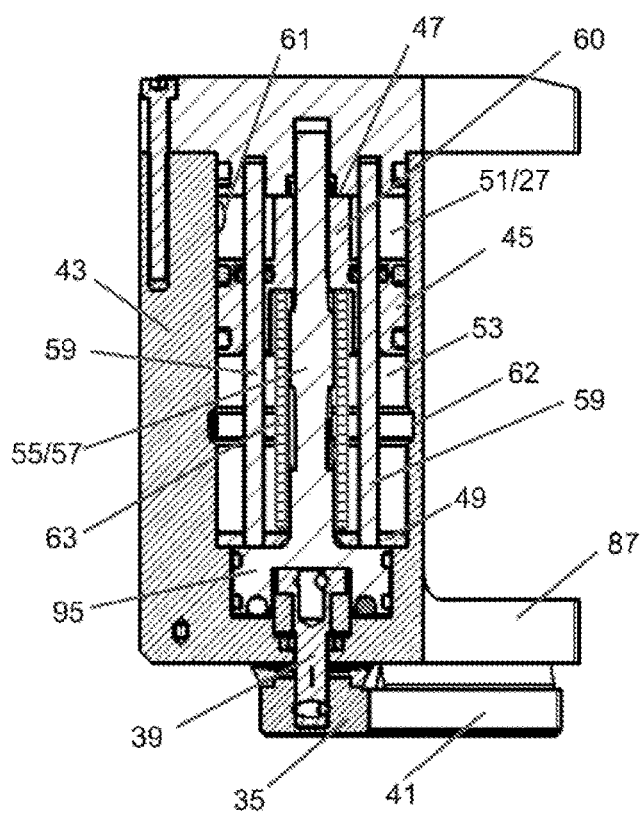
FIG. 6 shows a cross-section of a cleaning device having a wiper in a first sectional plane.
Figure 7:
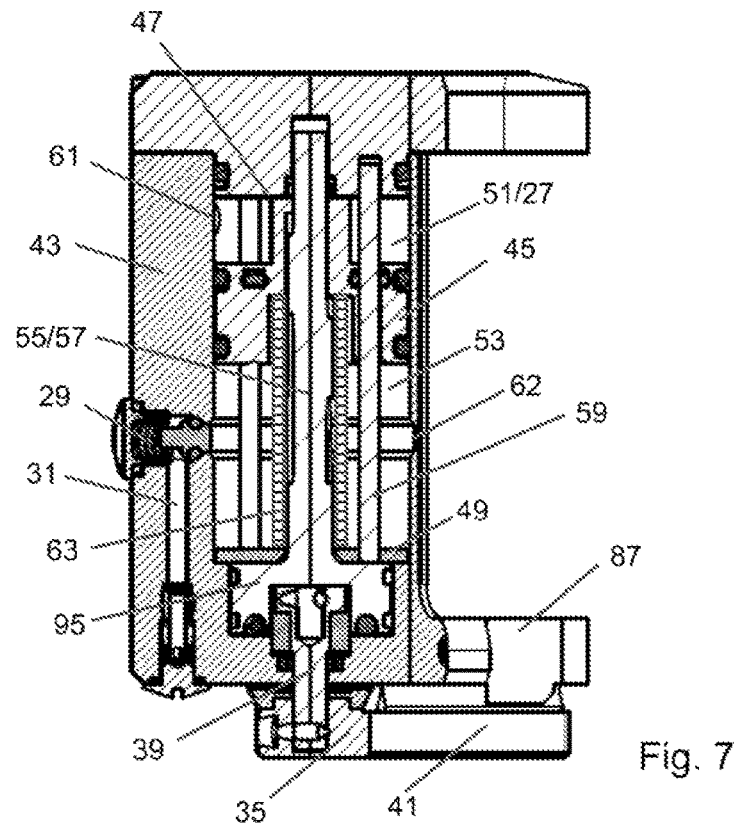
FIG. 7 shows a cross-section of the cleaning device of FIG. 6 in a second sectional plane.
Figure 8:
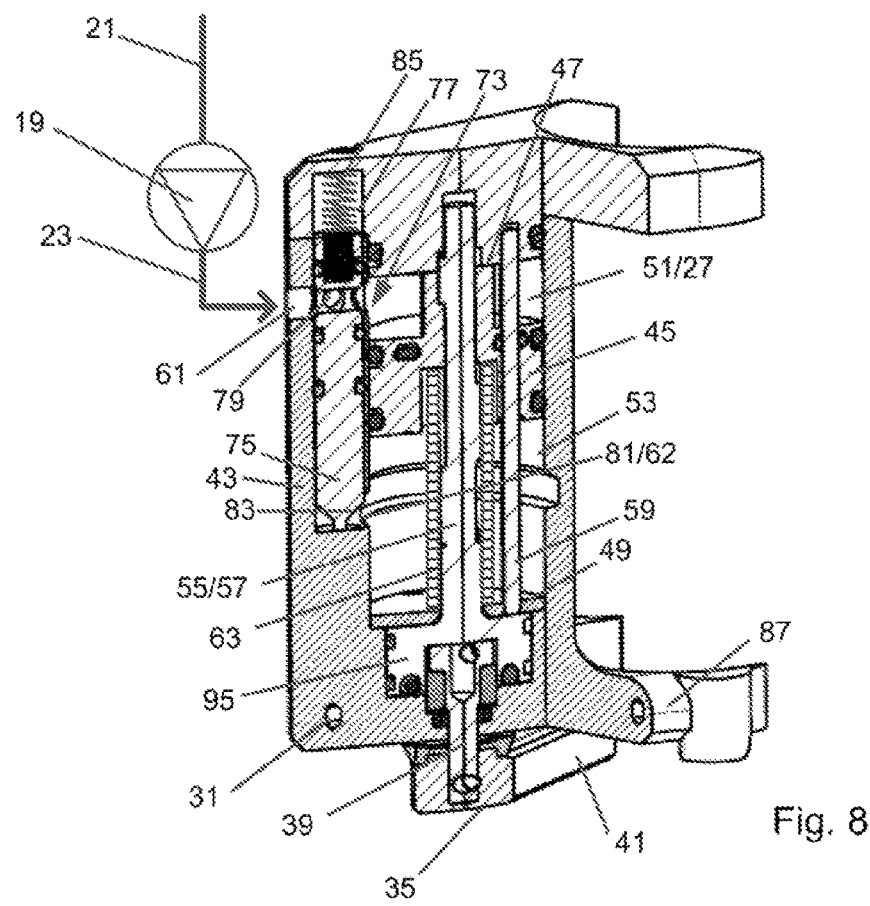
FIG. 8 shows a partial cross-section of the cleaning device of FIG. 6 in a third sectional plane.

Instead of the electric wiper drive, especially a pneumatic wiper drive connected to the pump 19 can alternatively be used. FIG. 5 shows a schematic illustration, and FIGS. 6 to 8 show sectional drawings of an embodiment of a cleaning device 1 having a wiper 35, the pneumatic wiper drive of which is arranged in the housing 25 of the cleaning device 1. As shown in FIG. 5, the pump 19 is also preferably arranged here in the housing 25 of the cleaning device 1. Alternatively, the pump 19 can be arranged outside the housing 25, as shown in FIG. 8. This offers the advantage, especially when used in explosion-prone areas, that the housing 25 located in the immediate vicinity of the sensor 5 in use is free of electrical components.

The wiper drives shown in FIGS. 5 to 8 are piston drives. Accordingly, they each comprise a piston 45 which is arranged in a piston housing 43 and which is movable in an axial direction back and forth in the piston housing 43 between two opposing stops 47, 49. Located in the piston housing 43 is a first chamber 51 and a second chamber 53 separated from the first chamber 51 by the piston 45, the volumes of which chambers change depending on the position of the piston 45. Accordingly, the volume of the first chamber 51 is minimal when the piston 45 is in the first end position shown in FIGS. 5 to 8, in which the piston 45 abuts against the first stop 47 that delimits the first chamber 51 on the side facing away from the second chamber 53, and maximum when the piston 45 is in a second end position shown in dashed lines in FIG. 5, in which the piston 45 abuts against the second stop 49. The piston 45 is connected to the shaft 39 of the wiper 35 by means of a mechanical converter 55 in such a way that a movement of the piston 45 from the first into the second end position results in a corresponding rotational movement of the wiper arm 41 from an initial position shown in FIG. 5 to an end position shown in dashed lines in FIG. 5. In this case, the wiper arm 41 is in the end position and in the initial position preferably in each case outside the outer portion 3 to be cleaned, or at least outside a section of the outer portion 3, such as, for example, the window 11 via which or through which the measured variable is measured.

The converter 55 shown in FIGS. 6 to 8 as an example comprises a spindle 57 which extends through the piston 45 and is rotatably mounted in the piston housing 43, and which is displaced by the axial movement of the piston 45 into a rotational movement about the longitudinal axis thereof. The spindle 57 is connected at the end to the shaft 39 of the wiper 35 such that a rotational movement of the spindle 57 causes a rotation of the shaft 39 about its longitudinal axis. The rotation of the shaft 39 in turn causes a rotational movement of the wiper arm 41 about an axis of rotation corresponding to the shaft 39. In this case, a pitch of a spindle external thread is preferably dimensioned such that the wiper arm 41 is moved by the piston movement of the piston 45 from the first end position into the second end position from its initial position into its end position and vice-versa.

In conjunction with the spindle 57, the cleaning device 1 preferably comprises at least one anti-rotation lock 59 which prevents rotation of the piston 45 about its longitudinal axis. For example, the securing pins shown in FIGS. 6 to 8, which extend parallel to the spindle 57 extending through the center of the piston 45 through an outer edge region of the piston 45, are suitable as an anti-rotation lock 59.

Alternatively, instead of the spindle 57, other converters known from the prior art that transform a translation movement into a rotary movement can also be used to convert the axial piston movement into the corresponding rotational movement of the wiper arm 41.

Regardless of the design of the converter 55, the pump 19 is connected via the discharge line 23 connected on the output side to the pump 19 to an inlet 61 of the piston housing 43 which opens into the first chamber 51. As shown in FIGS. 5 to 8, the inlet 61 is designed, for example, as a bore which extends through a wall region of the piston housing 43 that surrounds the first chamber 51 externally. In this case, the piston 45 has, for example on its side facing away from the second chamber 53, an extension 60 with a reduced base area, the axial height of which is dimensioned such that the inlet 61 also opens in the first chamber 51 when the piston 45 is in the first end position. Alternatively, the extension 60 can also be designed as a component of the first stop 47 on which the piston 45 rests in the first end position.

Regardless of the configuration in this regard, the pump 19 is switched on in that a pressure is gradually built up in the first chamber 51 by means of the pump 19, through which pressure the piston 45 is pressed in the direction of the second chamber 53. The resulting piston movement from the first end position to the second end position is converted by means of the converter 55 into a corresponding rotational movement of the wiper arm 41 from the initial position into the end position.

The first chamber 51 preferably also forms the pressure accumulator 27, which is connected or can be connected to the nozzle(s) 33 via the exhaust air duct 31 equipped with the pressure-controlled valve 29. In this case, the cleaning device 1 is designed such that the pressure-controlled valve 29 is opened by the pressure prevailing in the first chamber 51 when the piston 45 moved by the pressure prevailing in the first chamber 51 reaches the second end position.

FIG. 5 shows an example in which the exhaust air duct 31 opens into the interior of the piston housing 43 in a housing region of the piston housing 43, which, independently of the piston position, always surrounds a section of the first chamber 51. In this embodiment, the piston 45 is moved starting from the first end position by the pressure which is gradually built up in the first chamber 51 by means of the pump 19 into the second end position. Subsequently, the pressure in the first chamber 51 is further increased by means of the pump 19 until it exceeds the pressure value required for opening the pressure-controlled valve 29, and the pressure surge is output via the open pressure-controlled valve 29 and the nozzle(s) 33. Since the pressure-controlled valve 29 is permanently exposed here to the pressure prevailing in the first chamber 51, the cleaning device 1 is designed here in such a way that the pressure value required for opening the pressure-controlled valve 29 is truly greater than the pressure required for the movement of the piston 45 into the second end position. This ensures that the piston 45 reaches the second end position before the first chamber 51 is vented via the pressure-controlled valve 29.

FIGS. 6 to 8 show an alternative embodiment in which the exhaust air duct 31 equipped with the pressure-controlled valve 29 opens into a housing region of the piston housing 43 which only then adjoins the first chamber 51 when the piston 45 reaches the second end position. As can be seen from the sectional plane shown in FIG. 7, the exhaust air duct 31 opens here into a recess 62, which is introduced into a housing inner wall of the piston housing 43 and is open towards the interior of the piston housing 43, such as a recess 62 formed by a section of a bore extending through the piston housing 43 or a branch channel running around the inside in the piston housing 43. The recess 62 is arranged in the piston housing 43 at a height which is dimensioned such that a lower edge of the recess 62 facing the second stop 49 adjoins an upper side of an outer edge of the piston 45 facing the first chamber 51 when the piston 45 is in the second end position. Here too, the piston 45 is moved, starting from the first end position by the pressure which is gradually built up in the first chamber 51 by means of the pump 19, into the second end position. As a result, the axial height of the first chamber 51 running parallel to the direction of movement of the piston 45 is increased to such an extent that the exhaust air duct 31 opens into the first chamber 51, and the pressure prevailing in the first chamber 51 acts on the pressure-controlled valve 29. Since the pressure-controlled valve 29 in this variant is only exposed to the pressure prevailing in the first chamber 51 when the piston 45 reaches the second end position, a pressure-controlled valve 29 can be used here that already opens at a lower pressure value than that in the pressure-controlled valve 29 used in the example shown in FIG. 5. A further advantage of this embodiment is that the pressure required for carrying out the piston movement and thus also the wiper movement can be set independently of the employed pressure-controlled valve 29. In this case, the pressure required for carrying out the piston movement can be adjusted, for example, via a characteristic value of a spring mounted under the piston 45.

In the cleaning devices 1 shown in FIGS. 5 to 8, the first chamber 51 is vented by each pressure surge output via the pressure-controlled valve 29, so that the piston 45 can subsequently be moved back into the first end position.

Analogous to the rotational movement of the wiper arm 41 from the initial position into the end position, the rotational movement of the wiper arm 41 opposite thereto from the end position into the starting position can also be brought about by the fact that a pressure is built up in the second chamber 53 by means of the pump 19, through which pressure the piston 45 is pressed from the second end position into the first end position. To this end, however, both chambers 51, 53 would have to have an inlet that can be connected to the pump 19 via a channel equipped with a controllable valve, via which the chambers 51, 53 can be alternately subjected to pressure, and both chambers 51, 53 would have to be vented in alternation via a corresponding exhaust air duct.

Alternatively, the cleaning device 1 has a spring 63 which is arranged and designed such that the spring 63 is tensioned by the movement of the piston 45 from the first end position into the second end position, and the tensioned spring 63 moves the piston 45 back into the first end position when the pressure in the first chamber 51 drops due to the pressure surge output via the pressure-controlled valve 29. For this purpose, the spring 63 can be designed in different ways. For example, the spring 63 can comprise a spring element or a plurality of coupled spring elements. In this case, the individual spring elements can each be designed, for example, as a compression spring element, as a clamping spring element, as a coil spring element, or as a diaphragm.

In the shown embodiments, the spring 63 is designed as a compression spring arranged in the second chamber 53, which compression spring is compressed by the movement of the piston 45 from the first to the second end position. Alternatively, however, the spring can also be designed as a tension spring arranged in the first chamber 51, which is stretched by the movement of the piston 45 in the direction of the second chamber 53. Both variants offer the advantage that the spring 63 within the piston housing 43 is protected against environmental influences. Alternatively, however, the spring can also be arranged outside the piston housing 43 and/or be connected to the spindle 57 or the wiper 35. For example, the spring can be connected to the wiper 35 in such a way that it is tensioned by the movement of the wiper arm 41 from the initial position into the end position and moves the wiper arm 41 back into its initial position after the pressure surge has been output. In this case, the piston 45 is transported into the first end position via the wiper movement converted by the converter 55.

Regardless of the position and configuration of the spring 63, a pressure is built up by switching on the pump 19 in the first chamber 51, by means of which pressure the piston 45 is moved against the spring force of the spring 63 into the second end position. Due to this piston movement, the wiper arm 41 is moved from the initial position into the end position. When the piston 45 reaches the second end position, the pressure-controlled valve 29 opens automatically by the pressure acting thereon in this piston position. As a result, the first chamber 51 is vented and the pressure-surge cleaning of the outer portion 3 is carried out by the exhaust air. Due to the pressure drop caused by the venting of the first chamber 51, the pressure which tensions the spring 63 is released, so that the piston 45 is moved back into the first end position by the spring force of the tensioned spring 63. By means of this piston movement, the wiper arm 41 is simultaneously also moved from the end position back into the initial position via the converter 55. For this purpose, a wiper cleaning automatically follows each pressure-surge cleaning, and this sequence is repeated until the pump 19 is switched off, and the cleaning process necessarily ends with a wiper cleaning. This offers the advantage that, if necessary, any remaining air bubbles are removed by the final wiper cleaning after the last pressure-surge cleaning. Furthermore, the cleaning device 1 offers the advantage that the cleaning process is started by switching on the pump 19 and is ended by switching off the pump 19 so that, in contrast to the variant shown in FIG. 4, no control is required to control the sequence of the cleaning process.

As shown in FIGS. 5 to 8, the second chamber 53 is preferably designed as a closed chamber. In this case, the pump power of the pump 19, the volume of the second chamber 53 when the piston 45 is in the first end position, and the pressure value at which the pressure-controlled valve 29 opens are coordinated with one another such that the pressure which can be built up by means of the pump 19 in the first chamber 51 is greater than the internal pressure which prevails in the second chamber 53 when the piston 45 is in the second end position.

Alternatively, the second chamber 53 can be designed as a chamber that can be ventilated and vented. In this case, for example, an exhaust air duct 67, which is shown in dashed lines in FIG. 5 and is equipped with an outlet valve 65, is connected to the second chamber 53, via which exhaust air duct the second chamber 53 is vented when the pressure in the second chamber 53 exceeds a predetermined pressure upper limit. In this case, the exhaust air can be output, for example, to the environment or to at least one of the nozzles 33 which are additionally connected or can be connected to the exhaust air duct 67. The ventilation takes place, for example, via an air supply channel 71 which is shown in dashed lines in FIG. 5 and is equipped with an inlet valve 69 and is connected to the supply line 21, and via which the second chamber 53 is ventilated when the pressure in the second chamber 53 falls below a predetermined pressure lower limit. The inlet valve 69 and/or the outlet valve 65 are suitable especially as valves designed as a check valve.

Optionally, the cleaning device 1 additionally has a supply air controller 73 which is designed to temporarily close the inlet 61 opening into the first chamber 51 during each pressure-surge cleaning performed with the cleaning device 1, and to subsequently reopen it. An exemplary embodiment of this is shown in FIG. 8. This supply air controller 73 comprises a gate valve 75 which is arranged in a recess 77 in a housing wall region of the piston housing 43 through which the inlet 61 extends. The gate valve 75 is arranged in the recess 77 so as to be displaceable back and forth in a direction parallel to the longitudinal axis thereof between a passage position shown in FIG. 8 and a locking position. The gate valve 75 comprises a passage channel 79 extending through the gate valve 75, which passage channel 79 is aligned and arranged such that it forms a channel that is arranged in the inlet 61 and connects the first chamber 51 to the discharge line 23 connected to the pump 19 when the gate valve 75 is in the passage position. In addition, the gate valve 75 is designed such that it closes the inlet 61 when the gate valve 75 is in the locking position.

The recess 77 shown in FIG. 8 has a closed end region and an open-end region which is opposite the closed end region and is connected to the interior of the piston housing 43 via an opening 81. In this case, the opening 81 is arranged at a height within the piston housing 43 which is dimensioned such that a lower edge of the opening 81 facing the second stop 49 adjoins the upper side of the outer edge of the piston 45 facing the first chamber 51 when the piston 45 is in the second end position. It is thus achieved that the gate valve 75 is pushed into the locking position by the pressure prevailing in the first chamber 51 when the piston 45 reaches the second end position. In FIG. 8, the opening 81 is designed as a section of the branch channel, which surrounds the recess 62 and extends annularly in the piston housing 43, into which the exhaust air duct 31 also opens.

Optionally, the gate valve 75 has a pressure contact surface 83 on its end facing the opening 81, the radial distance of which decreases from a longitudinal axis of the piston housing 43 extending through the piston center in the opposite end of the gate valve 75. The inclined pressure contact surface 83 offers the advantage that the portion of the force exerted by the pressure prevailing in the first chamber 51 with the piston 45 located in the second end position on the gate valve 75, which portion acts parallel to the longitudinal axis of the gate valve 75 on the gate valve 75, is increased as a result of this.

The supply air controller 73 shown in FIG. 8 comprises a return spring 85 which is designed and arranged in the recess 77 in such a way that the return spring 85 is tensioned by the displacement of the gate valve 75 into the locking position and pushes the gate valve 75 back into the passage position when the compressive force exerted through the opening 81 on the gate valve 75 falls below the restoring force of the tensioned return spring 85. As a result, the inlet 61 is opened by the return spring 85 when the pressure in the first chamber 51 drops abruptly through the pressure surge output via the pressure-controlled valve 29.

Each nozzle 33 which is connected or can be connected to the exhaust air duct 31 for carrying out the pressure-surge cleanings can be designed, for example, as a component of the cleaning device 1 or as a component of the sensor 5.

In this respect, the cleaning device 1 has, for example, at least extension 87 in which the nozzle 33 or at least one of the nozzles 33 is arranged. FIG. 3 and FIGS. 6 to 8 show an exemplary embodiment with two extensions 87 formed integrally on opposite sides of the housing 25 of the cleaning device 1. In this case, at least one nozzle 33 connected to the exhaust air duct 31 is arranged in at least one of the two extensions 87. Optionally, the extensions 87 are simultaneously designed as a sensor enclosure which, when the cleaning device 1 is connected to the sensor 5, encompasses at least a section of the sensor 5 on the outside.

Alternatively, or additionally, the cleaning device 1 has, for example, one or more nozzles 33 arranged along the wiper arm 41 and connected to the exhaust air duct 31. In this case, the connection required for this between the exhaust air duct 31 and the nozzles 33 can be designed in different ways.

Figure 9:
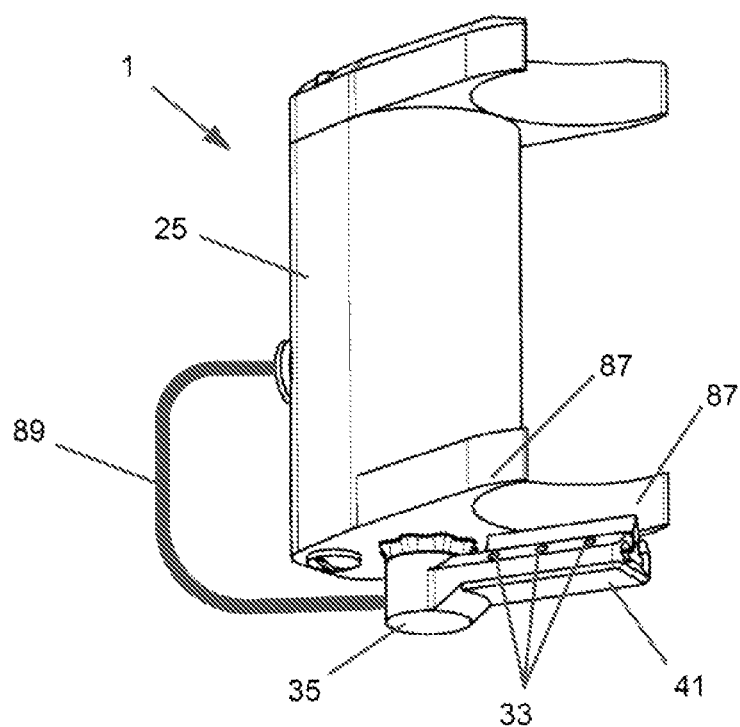
FIG. 9 shows a cleaning device according to the present disclosure with nozzles arranged on the wiper.

FIG. 9 shows an example in which the exhaust air duct 31 equipped with the pressure-controlled valve 29 is connected via a connecting line 89 arranged outside the housing 25 of the cleaning device 1 and a line extending inside the wiper 35 through the wiper arm 41 to the nozzles 33 arranged along the wiper arm 41.

Figure 10:
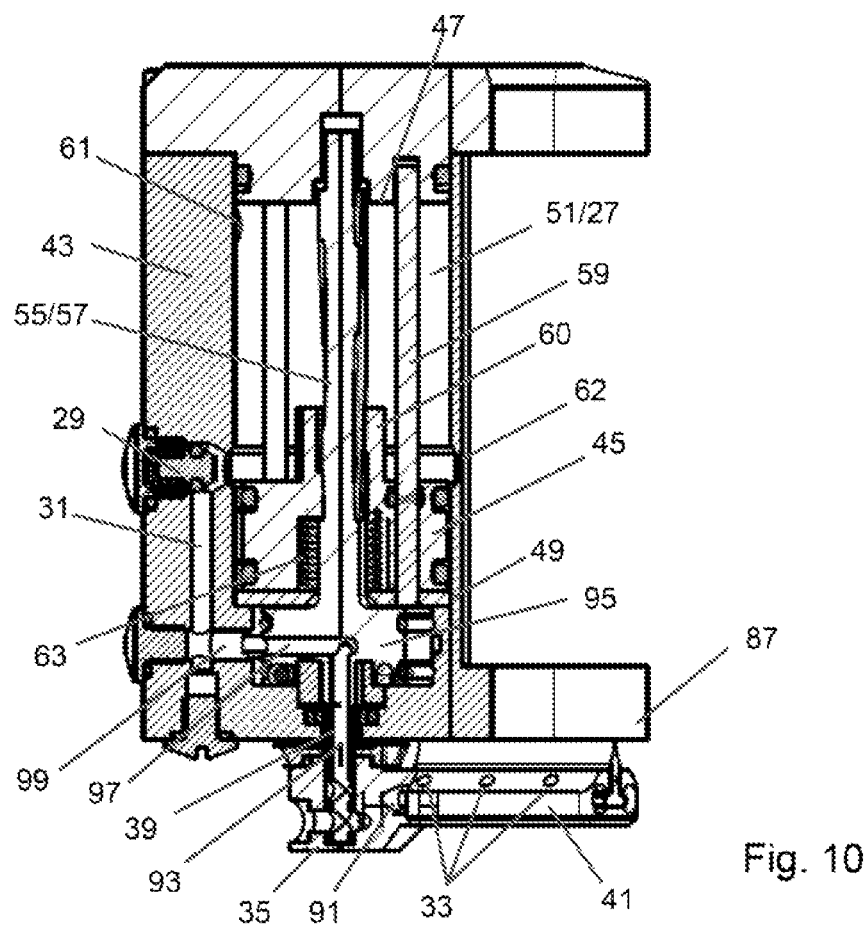
FIG. 10 shows a cross-section of a further cleaning device according to the present disclosure with nozzles arranged on the wiper.

FIG. 10 shows a modification of the cleaning device 1 shown in FIGS. 6 to 8, which has one or more nozzles 33 arranged along the wiper arm 41, as a further example. In this variant, the exhaust air duct 31 can be connected via a plurality of line portions connected to one another during each pressure-surge cleaning to the line 91 which runs inside the wiper 35 through the wiper arm 41 and is connected to the nozzles 33. These line portions comprise a first line portion 93 which is connected to the line 91 extending through the wiper arm 41 and extends along the shaft 39 of the wiper 35 or through the shaft 39 and extends in a direction running parallel to the shaft 39 into a rotary disk 95 connected to the spindle 57. The rotary disk 95 is arranged in the piston housing 43 on the side of the second stop 49 facing away from the first chamber 51, on which the piston 45 rests in the second end position. The first line portion 93 extending in the axial direction into the rotary disk 95 is connected at the end in the rotary disk 95 to a second line portion 97 which runs radially outwards inside the rotary disk 95 and opens at an outer side of the rotary disk 95. In addition, the line portions comprise a third line portion 99 connected to the exhaust air duct 31, which runs at least in portions through a housing wall of the piston housing 43 and opens into the interior of the piston housing 43 at the level of the mouth of the second line portion 97 at a position which is opposite the mouth of the second line portion 97 when the piston rotating the rotary disk 95 which is connected to the spindle 57 is located in the second end position shown in FIG. 10.

In the case of cleaning devices 1 which have nozzles 33 arranged in the wiper 35, the cleaning operations take place, for example, in that the wiper 35 is moved from the initial position into the end position in the manner described above, then a pressure-surge cleaning is carried out, in which the first chamber 51 is vented in a shock-like manner via the nozzles 33 integrated in the wiper 35, and the wiper 35 is subsequently moved back into its initial position. The nozzles 33 on the wiper arm 41 are preferably arranged in such a way that they are aligned with the outer portion 3 of the sensor 5 to be cleaned when the wiper 35 is in its end position. For this purpose, the nozzles 33 are arranged, for example, on the side of the wiper arm 41 which, when the wiper arm 41 is in the end position, points in the direction of the initial position. This offers the advantage that, during each cleaning process, a wiper cleaning follows the pressure-surge cleaning carried out by the nozzles 33 arranged on the wiper 35. This offers the advantage that each cleaning process ends with a wiper cleaning, by means of which air bubbles remaining on the outer area to be cleaned 3 are removed.

With regard to mounting measuring devices comprising the cleaning device 1 at a location of use, it is recommendable to combine the supply line 21 together with electrical connection lines 101 of the sensor 5 and/or the cleaning device 1 into a strand, via which the measuring device is immersed in the medium at the place of use.

The invention claimed is:

1. A cleaning device for cleaning an outer portion of a sensor, which is in contact with a medium during a measuring mode, for measuring a measured variable of the medium, the cleaning device comprising:
   a housing defining a volume therein;
   a pump connected on an input side to a supply line adapted as an air supply line;
   a pressure accumulator connected on an output side to the pump and disposed in the housing, which housing is mounted or is configured to be mounted on the sensor; and
   an exhaust air duct including a pressure-controlled valve, the exhaust air duct connected to the pressure accumulator and connected to or configured to be connected to at least one nozzle, which is aligned or configured to be aligned with the outer portion to be cleaned,
   wherein the cleaning device is configured to perform cleaning processes, which each include at least one pressure-surge cleaning in which:
      air drawn in by the pump via the supply line is compressed in the pressure accumulator; and
      at least a portion of the compressed air in the pressure accumulator is expelled as a pressure surge output via the least one nozzle connected to the exhaust air duct when a pressure of the compressed air in the pressure accumulator exceeds a pressure value required to open the pressure-controlled valve, wherein the pressure-controlled valve is configured such that, as the pressure surge output decreases the pressure in the pressure accumulator abruptly, the pressure-controlled valve automatically closes again.

2. The cleaning device of claim 1, wherein:
   the pump and the pressure accumulator are disposed in the housing of the cleaning device; and/or
   the cleaning device is either a component of a measuring device comprising the sensor and the cleaning device or a device that is capable of being mounted on the sensor, which device comprises at least one of the least one nozzle and/or the exhaust air duct, which can be connected to the least one nozzle configured as a component of the sensor.

3. The cleaning device of claim 1, further comprising:
   an extension integrally formed on the housing, in which extension the least one nozzle is disposed; or
   two extensions integrally formed on opposite sides of the housing; or
   two extensions integrally formed on opposite sides of the housing that, when the cleaning device is connected to the sensor, engage an exterior of at least a portion of the sensor, wherein the at least one nozzle is disposed in at least one of the two extensions.

4. The cleaning device of claim 1, further comprising:
   a wiper configured to perform wiper cleanings of the outer portion of the sensor and operable via a wiper drive.

5. The cleaning device of claim 4, wherein the wiper drive is an electric wiper drive or a pneumatic wiper drive.

6. The cleaning device of claim 4, wherein each cleaning process comprises at least one pressure-surge cleaning and ends with a wiper cleaning performed by the wiper.

7. The cleaning device of claim 4, wherein:
   the wiper drive comprises a piston disposed in a piston housing, the housing including a first chamber and a second chamber, separated from the first chamber by the piston;
   the piston is connected to a shaft of the wiper via a mechanical converter such that a movement of the piston from a first end position, in which the piston abuts a first stop that delimits the first chamber on a side facing away from the second chamber, into a second end position, in which the piston abuts a second stop opposite the first stop, causes a rotary movement of a wiper arm corresponding thereto from a starting wiper position into an end wiper position; and
   the pump is connected to an inlet of the piston housing that opens into the first chamber via a discharge line connected on the output side to the pump.

8. The cleaning device of claim 7, wherein the first chamber defines the pressure accumulator, and wherein the cleaning device is configured such that the pressure-controlled valve is opened by a pressure present in the first chamber when the piston, moved by the pressure present in the first chamber, reaches the second end position.

9. The cleaning device of claim 7, wherein:
   the exhaust air duct is disposed in the piston housing and opens into a recess that is open towards an interior of the piston housing or into a recess defined by a section of a bore extending through the piston housing or of a branch channel extending around the interior of the piston housing, and
   the recess is arranged at a position within the piston housing such that a lower edge of the recess facing the second stop adjoins an upper side of an outer edge of the piston facing the first chamber when the piston is in the second end position.

10. The cleaning device of claim 7, further comprising a spring including at least one spring element, wherein the spring is configured such that the spring is tensioned by the movement of the piston from the first end position to the second end position and such that the piston is moved back to the first end position by a spring force of the tensioned spring when the pressure in the first chamber drops due to the pressure surge output via the pressure-controlled valve.

11. The cleaning device of claim 10, wherein the spring is:
a compression spring disposed in the second chamber;
a tension spring disposed in the first chamber; or
a spring disposed outside the piston housing and/or connected to a spindle of the converter or the wiper,
wherein the at least one spring element is a compression spring element, a clamping spring element, a coil spring element, a diaphragm adapted as a spring element, or a plurality of coupled spring elements.

12. The cleaning device of claim 7, further comprising:
a supply air regulator configured to temporarily close and subsequently reopen the inlet into the first chamber during each pressure-surge cleaning performed with the cleaning device; or
a supply air regulator comprising a gate valve and a return spring, wherein:
the gate valve is disposed displaceably in a recess in a housing wall region of the piston housing through which the inlet passes;
the recess includes a closed end region and an open end region, which is opposite the closed end region and is connected to an interior of the piston housing via an opening or via an opening defined by a portion of a branch channel extending around the interior of the piston housing;
the opening is arranged at a position within the piston housing such that a lower edge of the opening facing the second stop adjoins an upper side of an outer edge of the piston facing the first chamber when the piston is in the second end position;
the gate valve is configured such that a pressure present in the first chamber pushes the gate valve into a locking position, thereby closing the inlet when the piston reaches the second end position;
the return spring is configured and arranged in the recess such that the return spring is tensioned by displacement of the gate valve into the locking position and pushes the gate valve into a passage position when a compressive force exerted by the opening on the gate valve falls below a restoring force of the tensioned return spring; and
the gate valve includes a passage channel extending through the gate valve, the passage channel aligned and arranged to define a channel disposed in the inlet and connecting the first chamber to the discharge line connected on the output side to the pump when the gate valve is in the passage position.

13. The cleaning device of claim 7, wherein:
the second chamber is configured as a closed chamber; or
the second chamber is configured as a vented chamber connected to the exhaust air duct, which includes the pressure-controlled valve via which the second chamber is vented when a pressure in the second chamber exceeds a predetermined pressure upper limit, and which is connected to the supply line via a supply air duct, which includes an inlet valve via which the second chamber is vented when the pressure in the second chamber falls below a predetermined lower pressure limit.

14. The cleaning device of claim 7, wherein:
the converter comprises a spindle that extends through the piston and configured to be driven by an axial movement of the piston into a rotational movement about a longitudinal axis of the spindle corresponding to the axial movement, wherein the spindle is connected at an end to the shaft of the wiper such that a rotational movement of the spindle causes the rotary movement of the wiper arm corresponding thereto; and/or
the wiper drive comprises at least one anti-rotation lock or at least one anti-rotation lock configured as a securing pin, which extends through an outer edge region of the piston, which prevents rotation of the piston about its longitudinal axis.

15. The cleaning device of claim 7, wherein the at least one nozzle comprises one or more nozzles disposed along the wiper arm and connected to the exhaust air duct, wherein the exhaust air duct:
is connected to the nozzles either via a connection and/or via a connecting line that extends outside the housing of the cleaning device and includers a line extending inside the wiper through the wiper arm; or
is configured to be connected to a line that is connected to the nozzles via a plurality of line sections connected to one another during each pressure-surge cleaning and that extends through the wiper arm within the wiper, wherein the line sections comprise:
a first line section connected to the line extending through the wiper arm and extending along the shaft of the wiper or through the shaft, which line section extends in a direction extending parallel to the shaft into a rotary disk connected to the spindle, wherein the rotary disk in the piston housing is disposed on a side of the second stop facing away from the first chamber;
a second line section connected to the first line portion, extending radially outwards inside the rotary disk and opening on an outer side of the rotary disk; and
a third line section connected to the exhaust air duct, which extends at least in portions through a housing wall of the piston housing and opens into the interior of the piston housing at a level of a mouth of the second line section at a position opposite the mouth of the second line section when the piston rotating the rotary disk connected to the spindle is in the second end position.

16. The cleaning device claim 7, wherein the at least one nozzle comprises one or more nozzles disposed along the wiper arm, connected to the exhaust air duct, and arranged on a side of the wiper arm facing the starting wiper position when the wiper arm is in the end wiper position.

17. The cleaning device of claim 1, wherein the pressure-controlled valve is configured as a check valve.

18. A measuring device comprising the cleaning device according to claim 1 and a sensor, wherein the cleaning device is permanently or detachably connected to the sensor, and/or the pump is arranged in the housing of the cleaning device.

19. A method for cleaning the outer portion of the sensor which is in contact with the medium during measuring mode, the method comprising:
providing the cleaning device according to claim 1; and
performing at least one cleaning process, wherein the at least one cleaning process comprises at least one pressure-surge cleaning and ends with a wiper cleaning, the at least one pressure-surge cleaning comprising:
air drawn in by the pump via the supply line is compressed in the pressure accumulator; and at least a portion of the compressed air in the pressure accumulator is expelled as a pressure surge output via the least one nozzle connected to the exhaust air duct when a pressure of the compressed air in the pressure accumulator exceeds a pressure value required to open the pressure-controlled valve.

* * * * *